United States Patent
King et al.

(10) Patent No.: US 8,776,197 B2
(45) Date of Patent: *Jul. 8, 2014

(54) SECURE ENTERPRISE SERVICE DELIVERY

(75) Inventors: William C. King, Lafayette, CA (US);
Lawrence S. Rybar, Doylestown, PA (US); Bjorn Hjelm, Livermore, CA (US); Xuming Chen, San Ramon, CA (US); Kwai Y. Lee, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,187

(22) Filed: Aug. 27, 2012

(65) Prior Publication Data
US 2013/0152178 A1    Jun. 13, 2013

Related U.S. Application Data

(63) Continuation-in-part of application No. 13/315,398, filed on Dec. 9, 2011.

(51) Int. Cl.
| | | |
|---|---|---|
| *G06F 7/04* | (2006.01) |
| *G06F 15/16* | (2006.01) |
| *G06F 17/30* | (2006.01) |
| *H04L 29/06* | (2006.01) |
| *H04N 7/16* | (2011.01) |
| *H04M 1/66* | (2006.01) |
| *H04M 1/68* | (2006.01) |
| *H04M 3/16* | (2006.01) |

(52) U.S. Cl.
USPC ............ 726/6; 726/3; 726/4; 726/27; 726/28; 726/29; 455/411

(58) Field of Classification Search
USPC ............... 726/14, 26–29, 3, 4, 6; 455/411
See application file for complete search history.

(56) References Cited

U.S. PATENT DOCUMENTS

| | | | |
|---|---|---|---|
| 8,037,522 B2* | 10/2011 | Holtmanns et al. | 726/19 |
| 8,260,259 B2* | 9/2012 | Semple et al. | 455/411 |
| 8,484,467 B2* | 7/2013 | Chan et al. | 713/168 |
| 8,543,814 B2* | 9/2013 | Laitinen et al. | 713/167 |

(Continued)

OTHER PUBLICATIONS

Lockr: Better Privacy for Social Networks, Tootoonchian et al, ACM, 2009.*

(Continued)

*Primary Examiner* — Luu Pham
*Assistant Examiner* — Jahangir Kabir

(57) ABSTRACT

A device receives enterprise information associated with enterprises supported by a network, and determines enterprise identifiers for one or more enterprises identified in the enterprise information. The device also receives information associated with devices and subscribers of the network, and determines security key parameters based on the information associated with the devices and the subscribers of the network. The device further generates, based on the security key parameters, a security key for each of the enterprise identifiers.

21 Claims, 9 Drawing Sheets

(56) References Cited

U.S. PATENT DOCUMENTS

| | | | |
|---|---|---|---|
| 2005/0102501 A1* | 5/2005 | Haukka et al. | 713/155 |
| 2006/0205388 A1* | 9/2006 | Semple et al. | 455/411 |
| 2007/0074275 A1* | 3/2007 | Bajko et al. | 726/4 |
| 2007/0204160 A1* | 8/2007 | Chan et al. | 713/171 |
| 2008/0171534 A1* | 7/2008 | Holtmanns et al. | 455/411 |
| 2009/0132806 A1* | 5/2009 | Blommaert et al. | 713/151 |
| 2009/0180614 A1* | 7/2009 | Rajagopal et al. | 380/228 |
| 2010/0281262 A1* | 11/2010 | Cheng et al. | 713/171 |
| 2011/0320802 A1* | 12/2011 | Wang et al. | 713/2 |
| 2012/0204231 A1* | 8/2012 | Holtmanns et al. | 726/3 |
| 2013/0117824 A1* | 5/2013 | Naslund et al. | 726/4 |

OTHER PUBLICATIONS

JPermit: Usable and Secure Registration of Guest-Phones into Enterprise VoIP Network, Lakshmi et al, IEEE, 2010.*

"3$^{rd}$ Generation Partnership Project; Technical Specification Group Services and System Aspects; Key establishment between a Universal Integrated Circuit Card (UICC) and a terminal (Release 10)", 3GPP TS 33.110 V10.1.0, http://www.3gpp.org, Jun. 2011, 28 pages.

* cited by examiner

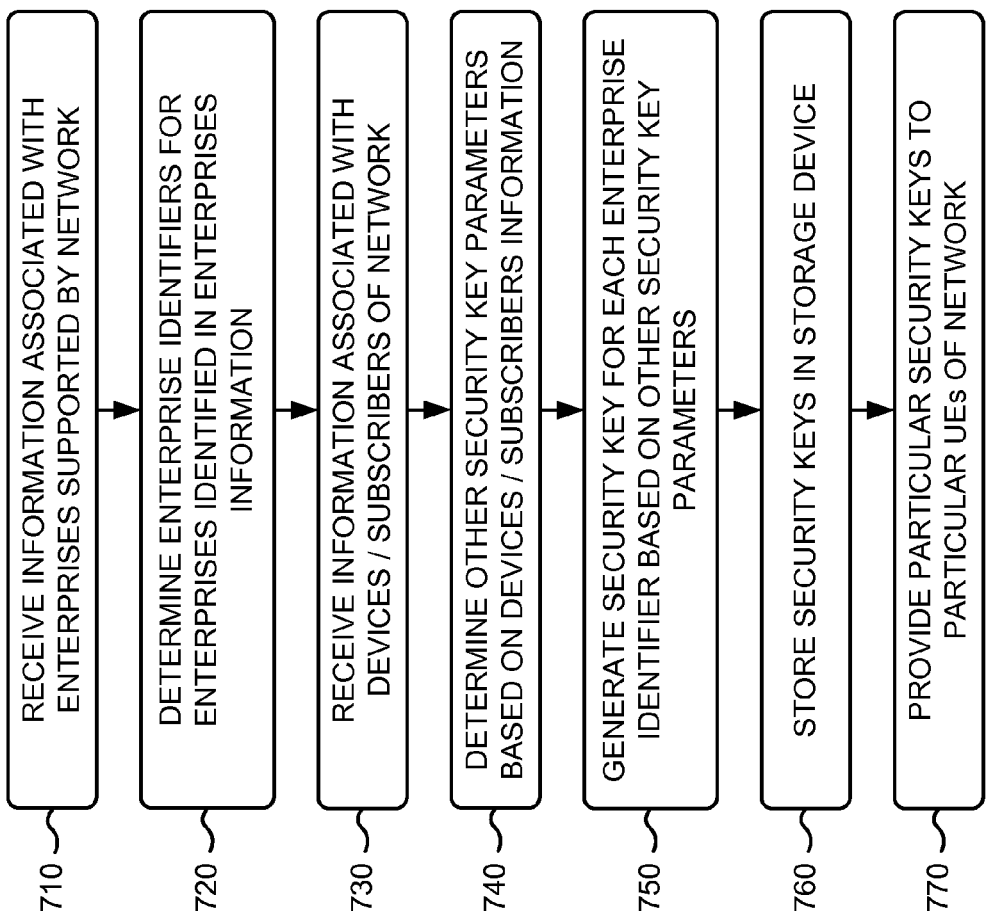

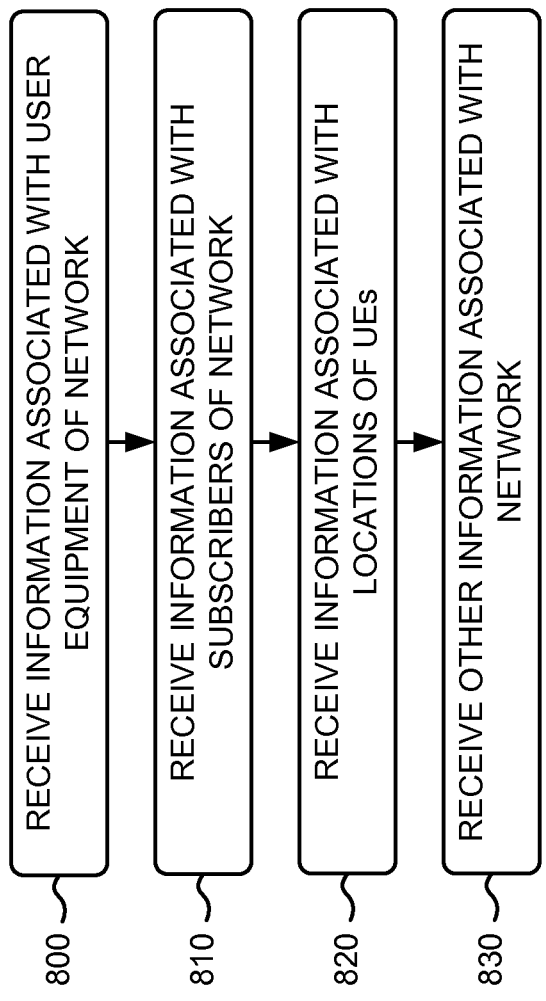

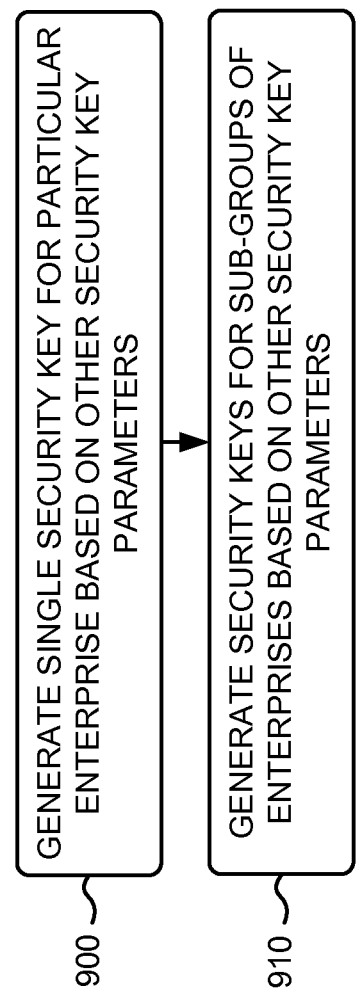

US 8,776,197 B2

SECURE ENTERPRISE SERVICE DELIVERY

RELATED APPLICATION

This application is a continuation-in-part of U.S. patent application Ser. No. 13/315,398, filed Dec. 9, 2011, the entire content of which is hereby incorporated by reference.

BACKGROUND

A service provider is an entity (e.g., a business or an organization) that sells bandwidth of or access to a network (e.g., the Internet, a data network, a telecommunication network, etc.) associated with the service provider. Service providers may include telecommunications companies, data carriers, wireless communications providers, Internet service providers, cable television operators offering high-speed Internet access, etc. Service provider networks enable users to access resources provided by enterprises (e.g., companies, government agencies, universities, etc.).

An enterprise often needs to authenticate a person (i.e., an end user associated with an enterprise) requesting use of the enterprise resources, and often provides some form of authentication of the end user. However, in many cases, it is preferable to have the service provider network perform this function on behalf of the enterprise.

BRIEF DESCRIPTION OF THE DRAWINGS

FIGS. 7-9 are flow charts of an example process for providing secure enterprise service delivery according to an implementation described herein.

DETAILED DESCRIPTION OF PREFERRED EMBODIMENTS

The following detailed description refers to the accompanying drawings. The same reference numbers in different drawings may identify the same or similar elements.

Generic bootstrapping architecture (GBA) is a technology that may enable authentication of an enterprise user for using enterprise services. In the GBA, user authentication may be instantiated via a security key (e.g., a GBA key) that may be provided in a Universal Integrated Circuit Card (UICC) of a mobile communication device (e.g., associated with the user) and in another network device, such as a network application function (NAF). The GBA may authenticate the user, for using an enterprise service, by requesting the security key from the UICC and from the NAF, and by verifying that the security keys match each other.

Security keys may be generated for each enterprise, and may be based on a variety of parameters. For example, the 3rd Generation Partnership Project (3GPP) Technical Specification (TS) 33.210 specifies that the GBA Ks_local key generation may depend on the following parameters: an Integrated Circuit Card Identification (ICCID); a Bootstrapping Transaction Identifier (B-TID); a random (RAND) challenge generated by a Home Location Register (HLR); a user equipment (UE) identifier (e.g., a mobile equipment identifier (MEID), an International Mobile Equipment Identity (IMEI), etc.); a UE application identifier; a UE UICC identifier; a counter limit; etc. The GBA key may be customized for a specific enterprise, for a specific UE, for a specific UICC, for a specific Long Term Evolution (LTE) session, using a specific network challenge value, etc.

Figure 1:
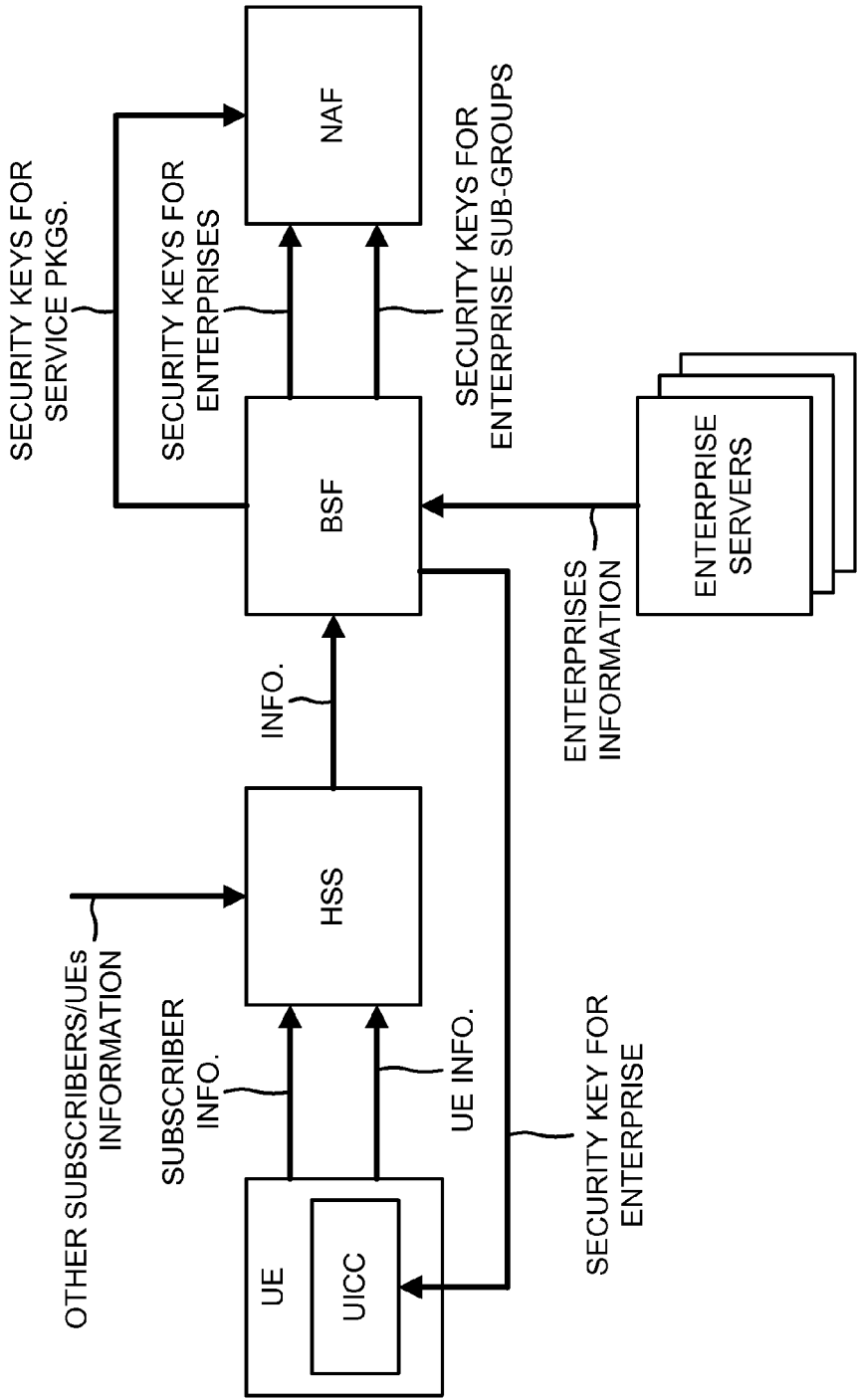
FIG. 1 is a diagram of an overview of an example implementation described herein.

In one example implementation, systems and/or methods described herein may utilize an enterprise's name as a unique identifier and for input into a Key Derivation Function (KDF) for generating a security key (e.g., a GBA key) unique to the enterprise. The security key may be used to control, protect, and route service requests and service delivery to subscribers of the enterprise. FIG. 1 is a diagram of an overview of an example implementation described herein. As shown, a UE may include a UICC and may interact with one or more of a NAF device, a bootstrapping server function (BSF) device, enterprise servers, and a home subscriber server (HSS).

The UE may include a mobile computation and communication device, such as a radiotelephone, a personal communications system (PCS) terminal, a personal digital assistant (PDA), a smartphone, etc. The UE may include a UICC that communicates with the BSF device to perform authentications of the UE. The NAF device may refer an unknown UE to the BSF device when the unknown UE is attempting access to a service provided by the enterprise servers. The BSF device may provide application independent functions for mutual authentication of the UE and other devices unknown to each other and for bootstrapping an exchange of secret session keys. The enterprise servers may provide services (e.g., associated with enterprises) that use resources provided by a service provider network, which may include the NAF device, the BSF device, and/or the HSS. The HSS may include one or more user databases that support network entities that handle calls. The one or more databases of the HSS may include subscription-related information (e.g., subscriber profiles).

As further shown in FIG. 1, the UE may provide subscriber information and UE information to the HSS, and the HSS may receive the subscriber information and the UE information. The subscriber information may include information associated with a user (e.g., of the UE), such as a subscriber identification, a subscriber name, a subscriber address, subscriber account information, etc. The UE information may include an identifier of the UE (e.g., a MEID, IMEI, etc.); attachment point information (e.g., a connection point of the UE to a network); a geographical location of the UE; etc. The HSS may also receive other subscribers/UEs information, such as information (e.g., metadata) about other UEs, users of other UEs, connection points of other UEs, etc.

The HSS may store the subscriber information, the UE information, and/or the other subscribers/UEs information in one or more subscriber profiles provided in a storage device. The HSS may provide the subscriber information, the UE information, and/or the other subscribers/UEs information to the BSF device, and the BSF device may receive the information. As further shown in FIG. 1, the enterprise servers may provide enterprises information to the BSF device, and the BSF device may receive the enterprises information. The enterprises information may include names of enterprises (e.g., companies, government agencies, universities, etc.), information associated with services provided by enterprises, such as email applications, database access, voicemail applications, messaging applications, video applications, and/or any other applications, services, and/or network resources provided by enterprises for one or more enterprise users (e.g., employees of enterprises).

The BSF device may group one or more applications, services, and/or network resources, associated with a particular enterprise identified in the enterprises information, into an enterprise package to be provided to one or more users (e.g., UEs) associated with the particular enterprise. For example, the BSF device may group a voicemail application, a messaging application, a financial application, and billing resources for the particular enterprise into an enterprise package for employees of the particular enterprise. The BSF device may associate an identifier (e.g., referred to herein as an enterprise identifier (ID)) with each enterprise package created by the BSF device for one or more enterprises. The enterprise IDs may be used as security key parameters for a Key Derivation Function (KDF) of the BSF device when generating security keys (e.g., GBA keys) for the enterprises.

Alternatively, or additionally, the BSF device may define enterprise sub-groups for one or more enterprises. An enterprise sub-group may include a portion of the users associated with a particular enterprise (e.g., an accounting department, an engineering department, etc.). Using the example above, the enterprise package that includes the voicemail application, the messaging application, the financial application, and the billing resources may be divided into a first enterprise sub-group that is associated with a first department (e.g., an engineering department) of the particular enterprise and includes the voicemail application and the messaging application. The enterprise package may be further divided into a second enterprise sub-group that is associated with a second department (e.g., a financial department) of the particular enterprise and includes the financial application and the billing resources. The BSF device may associate an enterprise sub-group ID with each enterprise sub-group created by the BSF device. The enterprise sub-group IDs of the enterprise sub-groups may be used as security key parameters for the KDF of the BSF device when generating security keys (e.g., GBA keys) for the enterprise sub-groups.

Alternatively, or additionally, if the number of users associated with a particular enterprise is too small to warrant generation of a unique enterprise ID for the enterprise, the BSF device may associate the users of the particular enterprise with a service package. The service package may include one or more applications, services, and/or network resources provided by a service provider and/or the particular enterprise. The BSF device may associate a service package ID with each group of enterprise users associated with enterprises that are too small to warrant generation of unique enterprise IDs. The service package IDs may be used as security key parameters for the KDF of the BSF device when generating security keys (e.g., GBA keys) for the service packages.

The BSF device may determine other security key parameters for the KDF based on the subscriber information, the UE information, and/or the other subscribers/UEs information. For example, the BSF device may utilize a UE identifier as a security key parameter that causes the BSF device to create a security key that is valid for a specific UE. Such a security key may become invalid when a subscriber switches the UICC to a UE (e.g., with a different MEID or IMEI) other than the specific UE.

The BSF device may generate a security key (e.g., a GBA key) for each enterprise ID based on the determined other security key parameters. In one example implementation, the BSF device may generate a security key for an enterprise associated with the UICC of the UE, and may provide the security key to the UICC. Alternatively, or additionally, the BSF device may generate security keys for each of the service packages designated by the BSF device, and may provide the security keys for the service packages to the NAF device. Alternatively, or additionally, the BSF device may generate security keys for the enterprises defined by the BSF device, and may provide the security keys for the enterprises to the NAF device. Alternatively, or additionally, the BSF device may generate security keys for the enterprise sub-groups defined by the BSF device, and may provide the security keys for the enterprise sub-groups to the NAF device.

The NAF device may receive the security keys for the service packages, the security keys for the enterprises, and the security keys for the enterprise sub-groups, and may store the security keys in a storage device referred to as a NAF Key Center. Alternatively, or additionally, the BSF device may store the security keys in a storage device associated with the BSF device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "user" and "subscriber" may be used interchangeably. Also, the terms "user" and "subscriber" are intended to be broadly interpreted to include a user device or a user of a user equipment (UE).

Figure 2:
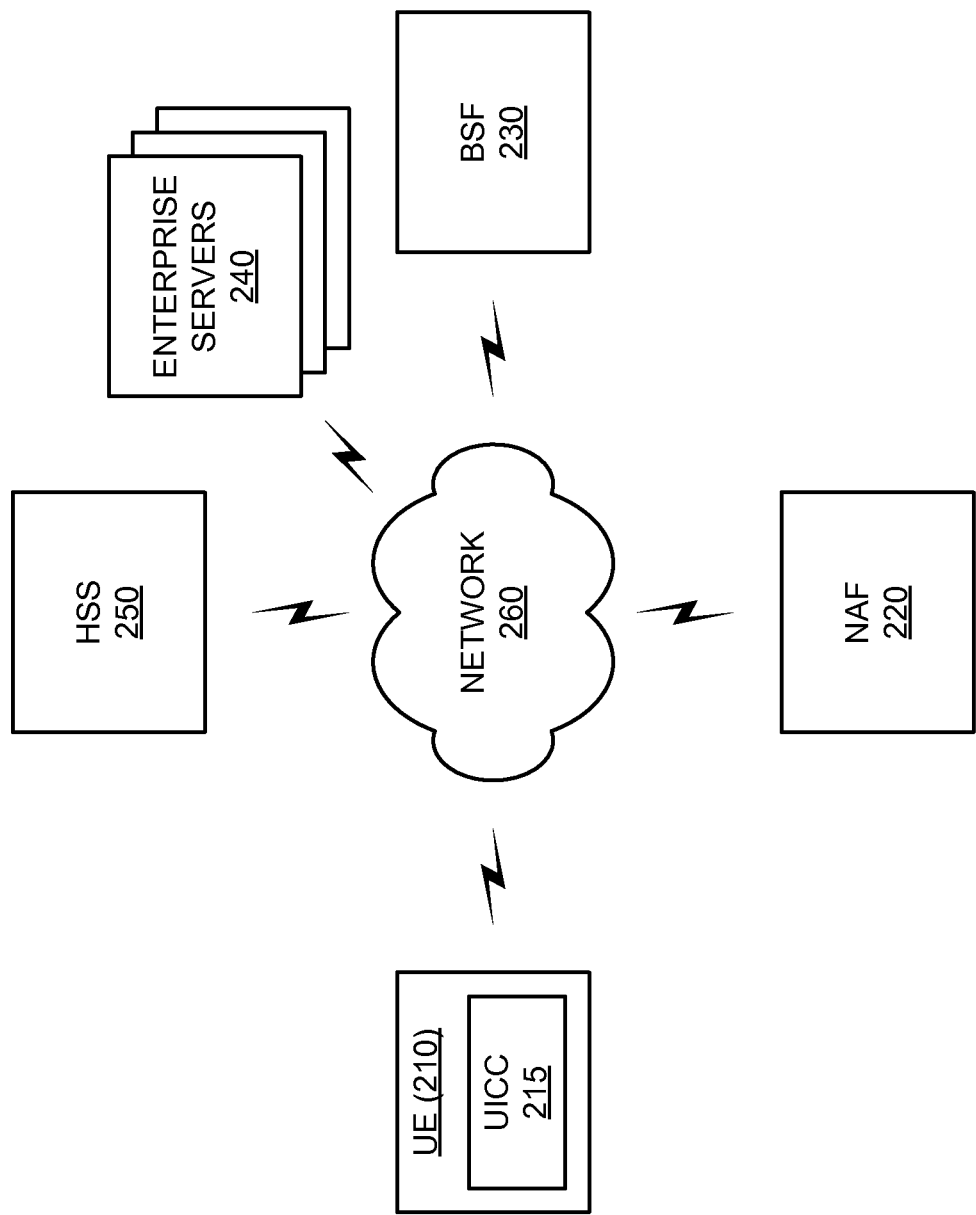
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user equipment (UE) 210 with a UICC 215, a network application function (NAF) device 220, a bootstrapping server function (BSF) device 230, one or more enterprise servers 240, and a home subscriber server (HSS) 250 connected by a network 260. Components of environment 200 may connect via wired and/or wireless connections or links.

UE 210 may include any device that is capable of communicating with NAF 220, BSF 230, enterprise servers 240, and/or HSS 250 via network 260. For example, UE 210 may include a mobile computation and communication device, such as a radiotelephone; a PCS terminal that may, for example, combine a cellular radiotelephone with data processing and data communications capabilities; a PDA that can include, for example, a radiotelephone, a pager, Internet/intranet access, etc.; a smartphone; a laptop computer; a tablet computer; a global positioning system (GPS) device; a content recording device (e.g., a camera, a video camera, etc.); a set-top box (STB); a voice over Internet protocol (VoIP) device; an analog terminal adaptor (ATA); etc. Alternatively, or additionally, UE 210 may include a fixed (e.g., provided in a particular location, such as within a user's home) computation and communication device, such as a laptop computer, a personal computer, a tablet computer, a STB, a television, a gaming system, etc.

In one example implementation, UE 210 may include UICC 215 that communicates with BSF 230 to perform authentications of UE 210. Alternatively, UICC 215 may be replaced with another storage device, such as a MicroSD memory card, device memory, an external hard drive, a flash memory data storage device, etc. UICC 215 may incorporate GBA functions needed for generation and/or storage of application session security keys through bootstrapping procedures.

NAF 220 may include one or more server devices, or other types of computation and communication devices, that gather, process, search, and/or provide information in a manner described herein. In an example implementation, NAF 220 may refer an unknown UE 210 to BSF 230 when the unknown UE 210 is attempting access to a service provided by enterprise servers 240. UE 210 and BSF 230 may agree on a session key to be used for encrypted data exchange with NAF 220. When UE 210 re-connects to BSF 230, NAF 220 may obtain the session key as well as user specific data from BSF 230 and may begin data exchange with UE 210 using the related session keys for encryption.

BSF 230 may include one or more server devices, or other types of computation and communication devices, that gather, process, search, and/or provide information in a manner described herein. In one example, BSF 230 may provide enterprise independent functions for mutual authentication of UE 210 and other devices unknown to each other and for bootstrapping an exchange of secret session keys.

In one example implementation, NAF 220 and/or BSF 230 may receive information associated with enterprises supported by environment 200 (e.g., via enterprise servers 240), and may determine enterprise identifiers for the enterprises identified in the enterprises information. NAF 220/BSF 230 may receive information associated with devices (e.g., UEs 210) and/or subscribers of environment 200, and may determine other security key parameters based on the devices/subscribers information. NAF 220/BSF 230 may generate a security key for each enterprise identifier based on the other security key parameters, and may store the generated security keys in a storage device associated with NAF 220/BSF 230. NAF 220/BSF 230 may provide particular security keys to particular UEs 210.

Enterprise server 240 may include one or more server devices, or other types of computation or communication devices, that gather, process, search, and/or provide information in a manner described herein. In an example implementation, enterprise server 240 may provide services (e.g., associated with an enterprise) that use resources provided by a service provider network, which may include NAF 220, BSF 230, and/or HSS 250. The services may include email applications, database access, voicemail applications, messaging applications, video applications, etc. provided by the enterprises. The services, provided by enterprise server 240, may make authentication requests to BSF 230, and may make requests for other services to other devices associated with the service provider network. The services, provided by enterprise server 240, may receive responses to such requests from BSF 230. Alternatively, or additionally, one or more of the services may be permanently stored on UE 210 or may be retrieved from enterprise server 240 and temporarily stored on UE 210.

HSS 250 may include one or more server devices, or other types of computation and communication devices, that gather, process, search, and/or provide information in a manner described herein. In an example implementation, HSS 250 may include one or more user databases that support network entities that handle calls. The one or more databases of HSS 250 may include subscription-related information (e.g., subscriber profiles). HSS 250 may perform authentication and authorization of a user, and may provide information about the user's (e.g., UE's 210) profile and subscriptions.

Network 260 may include a local area network (LAN), a wide area network (WAN), a metropolitan area network (MAN), a telephone network, such as the Public Switched Telephone Network (PSTN), an intranet, the Internet, an optical fiber or fiber optic-based network, or a combination of networks. In one example implementation, network 260 may enable UE 210 to communicate with one or more of NAF 220, BSF 230, enterprise servers 240, and/or HSS 250.

Although FIG. 2 shows example components of environment 200, in other implementations, environment 200 may contain fewer components, different components, differently arranged components, or additional components than depicted in FIG. 2. Alternatively, or additionally, one or more of the components of environment 200 may perform one or more functions described as being performed by another one or more of the components of environment 200.

Figure 3:
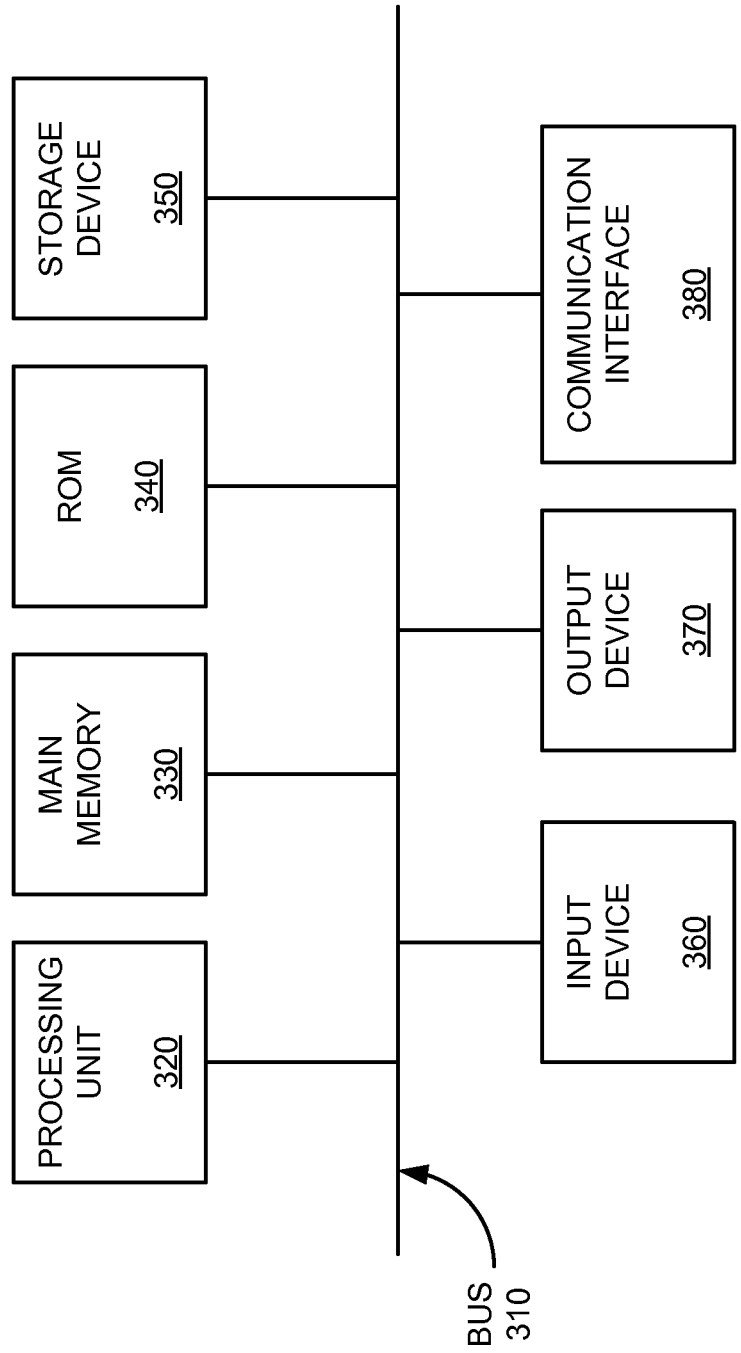
FIG. 3 is a diagram of example components of one or more devices of the environment illustrated in FIG. 1.

FIG. 3 is a diagram of example components of a device 300 that may correspond to one or more devices of environment 200 (FIG. 2). In one example implementation, one or more of the devices of environment 200 may include one or more devices 300 or one or more components of device 300. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
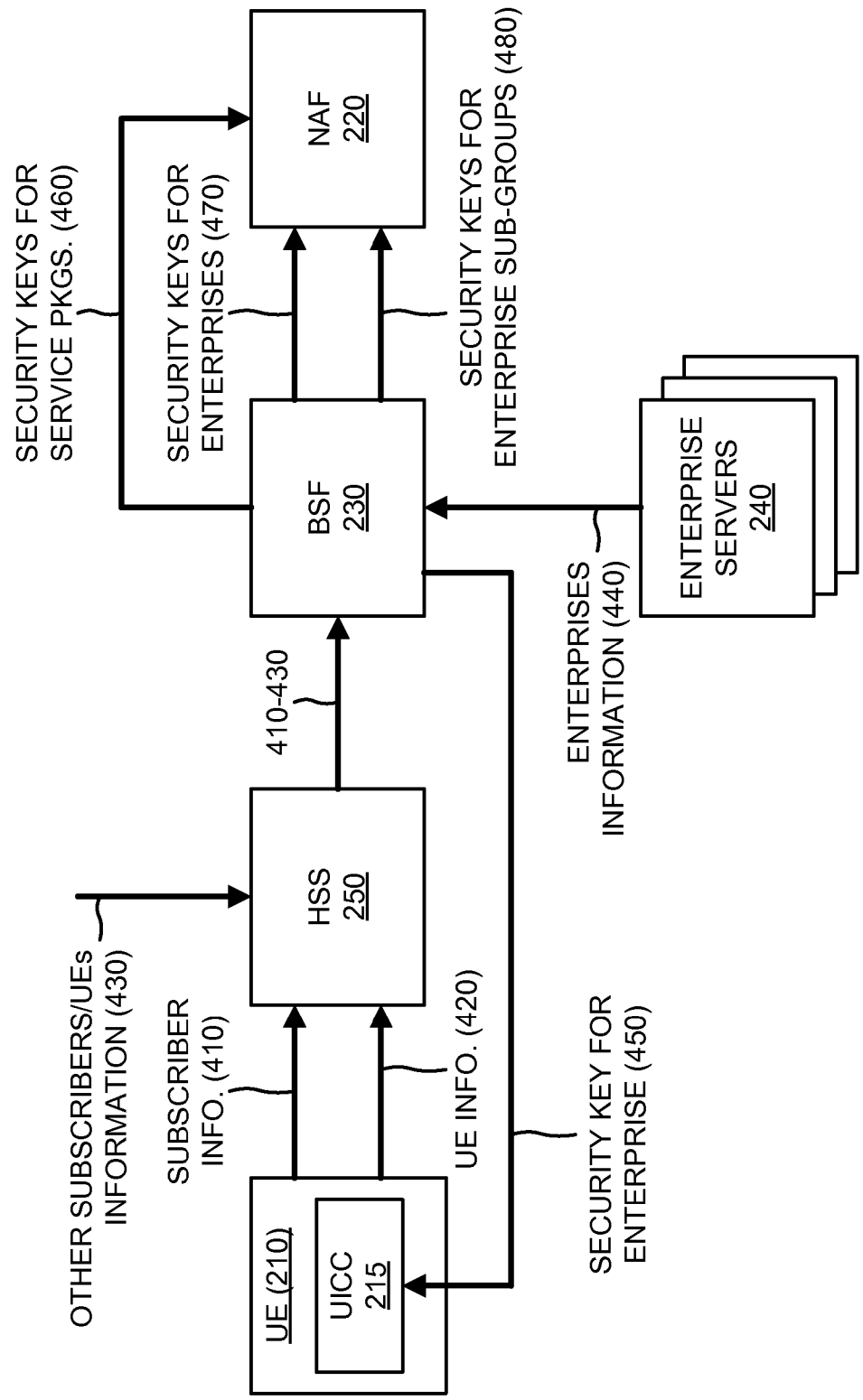
FIG. 4 is a diagram of example operations capable of being performed by an example portion of the environment illustrated in FIG. 2.

FIG. 4 is a diagram of example operations capable of being performed by an example portion 400 of environment 200 (FIG. 2). As shown in FIG. 4, environment portion 400 may include UE 210, NAF 220, BSF 230, enterprise servers 240, and HSS 250. UE 210, NAF 220, BSF 230, enterprise servers 240, and HSS 250 may include the features described above in connection with one or more of, for example, FIGS. 1-3.

As further shown in FIG. 4, UE 210 may provide subscriber information 410 and UE information 420 to HSS 250, and HSS 250 may receive subscriber information 410 and UE information 420. Subscriber information 410 may include information associated with a user (e.g., of UE 210), such as a subscriber identification, a subscriber name, a subscriber address, subscriber account information, etc. UE information 420 may include an identifier of UE 210 (e.g., a MEID, IMEI, etc.); attachment point information (e.g., a connection point of UE 210 to network 260); information that identifies a geographical location of UE 210; a zip code associated with UE 210; information that identifies a type (e.g., a brand, a manufacturer, etc.) of UE 210; information that identifies UE 210 capabilities (e.g., a screen size of UE 210, whether UE 210 can display high definition (HD) or three-dimensional (3D) content, etc.); etc. HSS 250 may also receive other subscribers/UEs information 430, such as information (e.g., metadata) about other UEs 210, users of other UEs 210, connection points of other UEs 210 (e.g., to network 260), etc.

HSS 250 may store subscriber information 410, UE information 420, and/or other subscribers/UEs information 430 in one or more subscriber profiles provided in a storage device (e.g., storage device 350, FIG. 3). HSS 250 may provide subscriber information 410, UE information 420, and/or other subscribers/UEs information 430 to BSF 230, and BSF 230 may receive information 410-430. Alternatively, or additionally, BSF 230 may retrieve information 410-430 from HSS 250, or may receive/retrieve the one or more subscriber profiles from HSS 250, instead of information 410-430. As further shown in FIG. 4, enterprise servers 240 may provide enterprises information 440 to BSF 230, and BSF 230 may receive enterprises information 440. Enterprises information 440 may include names of enterprises (e.g., companies, government agencies, universities, etc.), information associated with services provided by enterprises, such as email applications, database access, voicemail applications, messaging applications, video applications, and/or any other applications, services, and/or network resources provided by enterprises and/or a service provider for one or more enterprise users (e.g., employees of enterprises).

BSF 230 may group one or more applications, services, and/or network resources, associated with a particular enterprise identified in enterprises information 440, into an enterprise package to be provided to one or more users (e.g., UEs 210) associated with the particular enterprise. For example, BSF 230 may group a voicemail application, a messaging application, a financial application, and billing resources for the particular enterprise into an enterprise package for employees of the particular enterprise. BSF 230 may associate an identifier (e.g., referred to herein as an enterprise ID) with each enterprise package created by BSF 230 for one or more enterprises. The enterprise IDs may be used as security key parameters for a Key Derivation Function (KDF) of BSF 230 when generating security keys (e.g., GBA keys) for the enterprises associated with enterprise servers 240.

Alternatively, or additionally, BSF 230 may define enterprise sub-groups for one or more enterprises. An enterprise sub-group may include a portion of the users associated with a particular enterprise (e.g., an accounting department, an engineering department, etc.). Using the example above, the enterprise package that includes the voicemail application, the messaging application, the financial application, and the billing resources may be divided into a first enterprise sub-group that is associated with a first department (e.g., an engineering department) of the particular enterprise and includes the voicemail application and the messaging application. The enterprise package may be further divided into a second enterprise sub-group that is associated with a second department (e.g., an accounting department) of the particular enterprise and includes the financial application and the billing resources. BSF 230 may associate an enterprise sub-group ID with each enterprise sub-group created by BSF 230. The enterprise sub-group IDs of the enterprise sub-groups may be used as security key parameters for the KDF of BSF 230 when generating security keys (e.g., GBA keys) for the enterprise sub-groups.

Alternatively, or additionally, if the number of users associated with a particular enterprise is too small to warrant generation of a unique enterprise ID for the enterprise, BSF 230 may associate the users of the particular enterprise with a service package. The service package may include one or more applications, services, and/or network resources provided by a service provider and/or the particular enterprise. BSF 230 may associate a service package ID with each group of enterprise users associated with enterprises that are too small to warrant generation of unique enterprise IDs. The service package IDs may be used as security key parameters for the KDF of BSF 230 when generating security keys (e.g., GBA keys) for the service packages.

BSF 230 may determine other security key parameters for the KDF based on subscriber information 410, UE information 420, and/or other subscribers/UEs information 430. For example, BSF 230 may utilize a UE identifier as a security key parameter that causes BSF 230 to create a security key that is valid for a specific UE 210. Such a security key may become invalid when a subscriber switches UICC 215 to a UE (e.g., with a different MEID or IMEI) other than the specific UE 210.

BSF 230 may generate a security key (e.g., a GBA key) for each enterprise ID based on the determined other security key parameters. In one example implementation, BSF 230 may generate a security key for an enterprise associated with UICC 215 of UE 210, and may provide the security key to UICC 215, as indicated by reference number 450. Alternatively, or additionally, BSF 230 may generate security keys for each of the service packages designated by BSF 230, and may provide the security keys for the service packages to NAF 220, as indicated by reference number 460. Alternatively, or additionally, BSF 230 may generate security keys for the enterprises defined by BSF 230, and may provide the security keys for the enterprises to NAF 220, as indicated by reference number 470. Alternatively, or additionally, BSF 230 may generate security keys for the enterprise sub-groups defined by BSF 230, and may provide the security keys for the enterprise sub-groups to NAF 220, as indicated by reference number 480. In one example, security key 450 may be included in security keys 460, security keys 470, or security keys 480.

NAF 220 may receive security keys 460 for the service packages, security keys 470 for the enterprises, and security keys 480 for the enterprise sub-groups, and may store security keys 460-480 in a storage device (e.g., storage device 350, FIG. 3) referred to as a NAF Key Center. Alternatively, or additionally, BSF 230 may store security keys 460-480 in a storage device (e.g., storage device 350, FIG. 3) associated with BSF 230. Although not shown in FIG. 4, BSF 230 and/or NAF 220 may provide one or more of security keys 460-480 to one or more UICCs 215 associated with one or more UEs 210.

In one example implementation, BSF 230 may implement and manage an enterprise-based GBA NAF naming convention that provides GBA NAF-specific credentials to securely manage, control, and deliver services to the enterprise served through a particular NAF. The enterprise names (e.g., company names, university names, government agency names, etc.) may be used as NAF IDs or NAF group IDs in a GBA User Security Settings (GUSS) data scheme and may be provisioned in subscriber profiles stored in HSS 250. The enterprise names may be provided to UICCs (e.g., UICC 215) as part of GBA credentials through activation and may be changed using updates. For example, BSF 230 may use an enterprise name of "Company A Name" (spelled out) as an input to a GBA for Company A's enterprise service control and delivery. BSF 230 may generate a security key based on Company A's name and using the KDF. The security key may be used to control and securely deliver services for Company A subscribers.

BSF 230 may apply the enterprise naming convention to any enterprise in the world since any language may be used for the enterprise names. In one example, BSF 230 may utilize any enterprise name as long as the enterprise name is copyrighted and can be used in a unicode format. BSF 230 may apply the enterprise naming convention to government entities (e.g., federal, state, county, city, etc. entities) and/or to different countries when subscribers are roaming (e.g., depending on roaming agreements).

If a number of subscribers for a particular enterprise is small (e.g. less than a particular number), BSF 230 may determine that the particular enterprise does not justify assignment of a security key unique to the particular enterprise. In one example, BSF 230 may group such small enterprises together as an enterprise group, and may generate a security key for the enterprise group based on the names of the small enterprises (e.g., based on a concatenation of the names of the small enterprises). Alternatively, or additionally, if the number of users associated with a particular enterprise is too small to warrant generation of a unique enterprise ID for the enterprise, BSF 230 may associate the users of the particular enterprise with a service package, as described above.

If a number of subscribers for a particular small enterprise grows to certain size, BSF 230 may determine that a security key unique to the particular small enterprise should be assigned. In such a scenario, BSF 230 may move the particular small enterprise subscribers to a separate security key (e.g., based on the particular small enterprise's name), and may generate a renamed security key for the enterprise group to which the particular small enterprise used to belong. For example, the renamed security key may be generated based on a concatenation of the names of the remaining small enterprises in the enterprise group.

If a number of subscribers for a particular enterprise associated with a unique enterprise ID grows to a certain size or if the particular enterprise desires service differentiation among different enterprise sub-groups, BSF 230 may designate the enterprise ID for the particular enterprise as a NAF group. BSF 230 may define enterprise sub-groups for the particular enterprise. BSF 230 may associate an enterprise sub-group ID with each enterprise sub-group created by BSF 230. The enterprise sub-group IDs of the enterprise sub-groups may be used as security key parameters for the KDF of BSF 230 when generating security keys (e.g., GBA keys) for the enterprise sub-groups.

It may be assumed that the security keys, generated by BSF 230, reside in a home core network infrastructure. However, due to business requirements, the security keys may be required to reside in an enterprise infrastructure (e.g., in enterprise servers 240) and/or in different countries. In such scenarios, appropriate safeguards (e.g., firewalls) and transport security between BSF 230 and the "out-of-network" security keys may be provided.

In one example implementation, BSF 230 may utilize the enterprise naming convention to provide secure and targeted service delivery to enterprises using a GBA network infrastructure. The GBA network may enable establishment of a secure communication pipeline over which services may be securely delivered to enterprise subscribers with valid subscriptions. The communication pipeline may be secured using the KDF described below in connection with FIG. 5.

Although FIG. 4 shows example components of environment portion 400, in other implementations, environment portion 400 may include fewer components, different components, differently arranged components, or additional components than depicted in FIG. 4. Alternatively, or additionally, one or more components of environment portion 400 may perform one or more other tasks described as being performed by one or more other components of environment portion 400. For example, NAF 220 may perform one or more tasks described as being performed by BSF 230.

Figure 5:
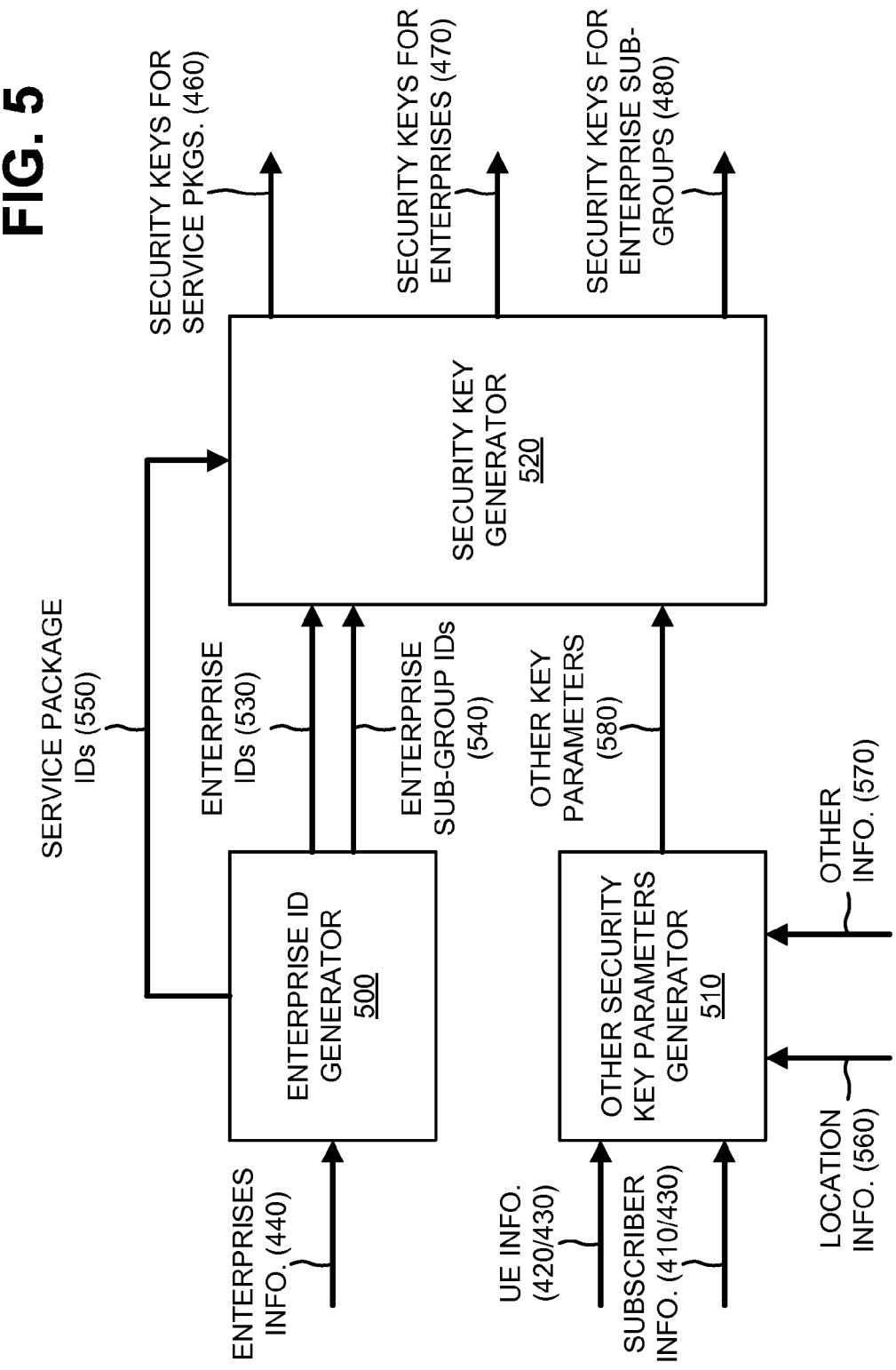
FIG. 5 is a diagram of example functional components of a bootstrapping server function (BSF) device depicted in the environment of FIG. 2.

FIG. 5 is a diagram of example functional components of BSF 230. In one implementation, the functions described in connection with FIG. 5 may be performed by one or more components of device 300 (FIG. 3) or by one or more devices 300. As shown in FIG. 5, BSF 230 may include an enterprise ID generator 500, other security key parameters generator 510, and a security key generator 520.

Enterprise ID generator 500 may receive enterprises information 440 from enterprises servers 240 (not shown), and may group one or more applications, services, and/or network resources, associated with a particular enterprise identified in enterprises information 440, into an enterprise package. Enterprise ID generator 500 may associate identifiers or tags (e.g., enterprise IDs 530) with the enterprise packages defined by enterprise ID generator 500 for one or more enterprises. As further shown in FIG. 5, enterprise ID generator 500 may provide enterprise IDs 530 to security key generator 520.

Enterprise ID generator 500 may define enterprise sub-groups for one or more enterprises based on enterprises information 440. In one example, enterprise ID generator 500 may define the enterprise sub-groups as sub-groups of the enterprise IDs defined by enterprise ID generator 500. Enterprise ID generator 500 may associate identifiers or tags (e.g., enterprise sub-group IDs 540) with the enterprise sub-groups defined by enterprise ID generator 500. As further shown in FIG. 5, enterprise ID generator 500 may provide enterprise sub-group IDs 540 to security key generator 520.

If the number of users associated with a particular enterprise is too small (e.g., less than a particular number) to warrant generation of a unique enterprise ID for the enterprise, enterprise ID generator 500 may associate the users of the particular enterprise with a service package, based on enterprises information 440. Enterprise ID generator 500 may associate identifiers or tags (e.g., service package IDs 550) with the service packages defined by enterprise ID generator 500. As further shown in FIG. 5, enterprise ID generator 500 may provide service package IDs 550 to security key generator 520.

Other security key parameters generator 510 may receive subscriber information 410, UE information 420, and/or other subscribers/UEs information 430. As further shown in FIG. 5, other security key parameters generator 510 may receive location information 560 and other information 570. Location information 560 may include information associated with physical locations (e.g., GPS locations) of one or more UEs 210. Other information 570 may include information obtained from accounting systems, billing systems, marketing systems, etc. associated with environment 200. Other security key parameters generator 510 may determine other security key parameters 580 based on subscriber information 410, UE information 420, other subscribers/UEs information 430, location information 560, and/or other information 570. Other security key parameters 580 may include, for example, ICCIDs, B-TIDs, RAND challenges, counter limits, etc. As further shown in FIG. 5, other security key parameters generator 510 may provide other security key parameters 580 to security key generator 520.

Security key generator 520 may include a KDF that utilizes parameters, such as other key parameters 580, to generate security keys (e.g., GBA keys). Security key generator 520 may receive enterprise IDs 530, enterprise sub-group IDs 540, and service package IDs 550 from enterprise ID generator 500, and may receive other key parameters 580 from other security key parameters generator 510. Security key generator 520 may utilize one or more of enterprise IDs 530, enterprise sub-group IDs 540, service package IDs 550, and other key parameters 580 to generate security keys for authenticating UEs 210 and/or UICCs 215 to utilize one or more applications, services, and/or network resources associated with enterprises.

In one example, security key generator 520 may generate security keys 460 (e.g., GBA keys) for the service packages defined by BSF 230, based on service package IDs 550 and other security key parameters 580.

Alternatively, or additionally, security key generator 520 may generate security keys 470 (e.g., GBA keys) for the enterprises defined by BSF 230, based on enterprise IDs 530 and other security key parameters 580. Each security key 470 may enable authentication and authorization of all applications, services, and/or network resources associated with the enterprise defined by the corresponding enterprise ID 530. In one example, security key generator 520 may generate security keys 470 according to the following GBA KDF: Enterprise Security Key=SHA-256(Ks, RAND, B-TID, IMEI, BSF_ID, Enterprise Name, Enterprise Group, . . . , Service_Package_IDs).

Alternatively, or additionally, security key generator 520 may generate security keys 480 (e.g., GBA keys) for the enterprise sub-groups defined by BSF 230, based on enterprise sub-group IDs 540 and other security key parameters 580. Each security key 480 may enable authentication and authorization of all applications, services, and/or network resources associated with the enterprise sub-group defined by the corresponding enterprise sub-group ID 540.

In one example, any of security keys 460-480 may be made valid for a specific UE 210 by incorporating a terminal ID (e.g., a UE 210 ID) in the parameters considered by security key generator 520. For example, if a particular security key 470 is associated with a particular enterprise and is valid for UE 210, the particular enterprise's services may not be used by a subscriber when UICC 215 is installed in a different UE with a different MEID/IMEI than the MEID/IMEI of UE 210. However, the particular enterprise's services may be enabled for the subscriber's different UE via an activation process.

Alternatively, or additionally, any of security keys 460-480 may be made valid for a specific location by incorporating location information in the parameters considered by security key generator 520. For example, a service provider can make a particular security key 470 for a particular enterprise valid only for a particular location. Any movement of UE 210/UICC 215 outside an area defined by the location information may result in a failure of authentication and authorization of the particular enterprise for UE 210/UICC 215. For example, the particular security key 470 may authorize a subscriber (e.g., via UE 210) to view a live broadcast of a sporting event while the subscriber and UE 210 are located within the stadium hosting the sporting event. If the subscriber/UE 210 leaves the stadium, the particular security key 470 may become invalid and the subscriber may be unable to view the live broadcast of the sporting event.

Although FIG. 5 shows example functional components of BSF 230, in other implementations, BSF 230 may include fewer functional components, different functional components, differently arranged functional components, or additional functional components than depicted in FIG. 5. Alternatively, or additionally, one or more functional components of BSF 230 may perform one or more other tasks described as being performed by one or more other functional components of BSF 230.

Figure 6:
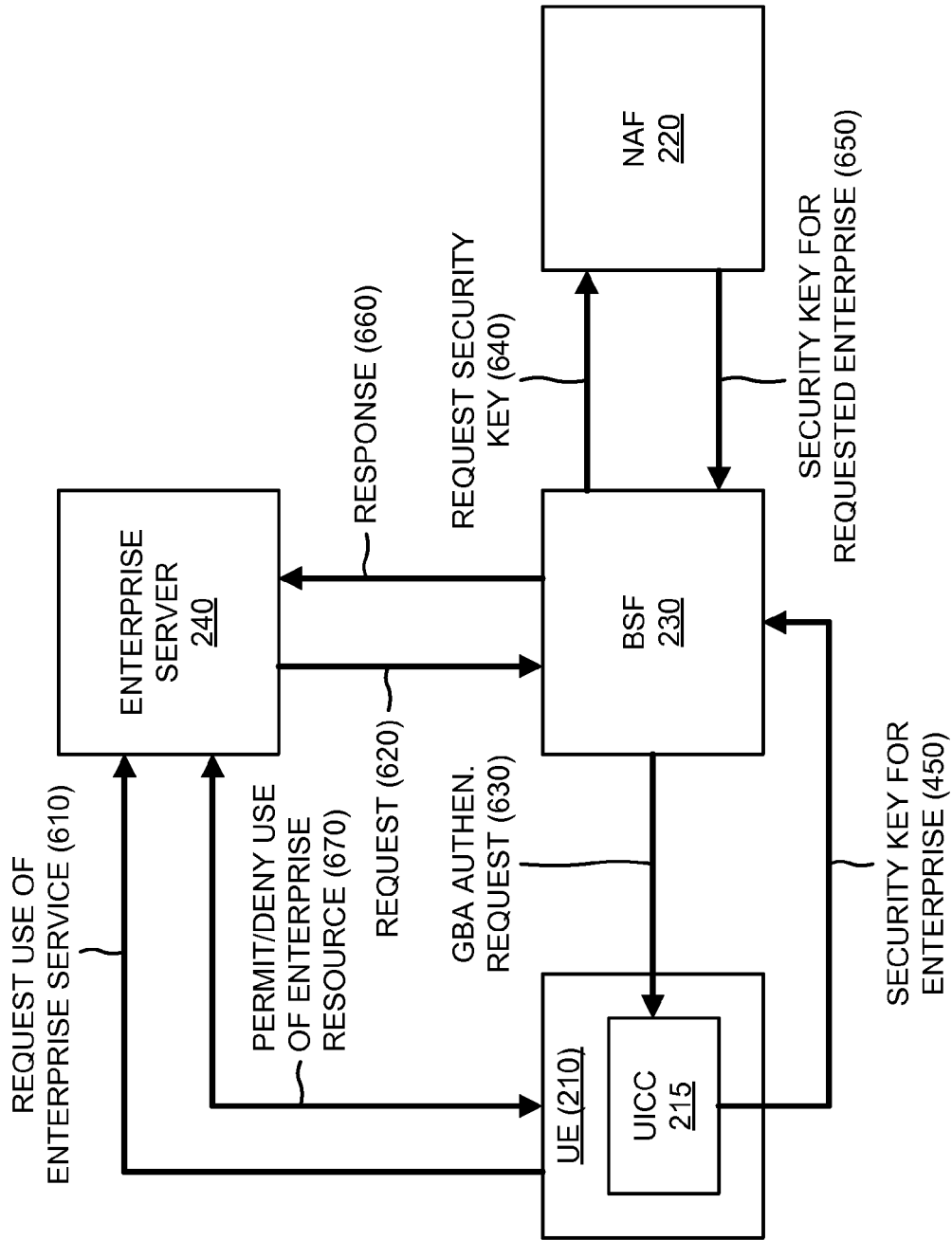
FIG. 6 is a diagram of example authentication operations capable of being performed by an example portion of the environment of FIG. 2.

FIG. 6 is a diagram of example authentication operations capable of being performed by an example portion 600 of environment 200 (FIG. 2). As shown in FIG. 6, environment portion 600 may include UE 210, UICC 215, NAF 220, BSF 230, and enterprise server 240. UE 210, UICC 215, NAF 220, BSF 230, and enterprise server 240 may include the features described above in connection with one or more of, for example, FIGS. 1-5.

As further shown in FIG. 6, a user (not shown), via UE 210, may attempt to use an enterprise service provided by enterprise server 240, as indicated by reference number 610. Based on requested use 610 of the enterprise service, enterprise server 240 may generate a request 620 to use authentication services provided by BSF 230. Request 620 may include a request for authentication of UE 210, and may specify a type of authentication requested, a service identifier, an identifier for the user (e.g., a user identifier), a MEID of UE 210, etc. For example, request 620 may include a request for a GBA authentication of UE 210.

Enterprise server 240 may provide request 620 to BSF 230, and BSF 230 may receive request 620. BSF 230 may authenticate the enterprise service if the enterprise service is trusted. The enterprise service may include registered credentials for service authentication and/or other data for authentication. If the enterprise service is trusted, BSF 230 may provide a GBA authentication request 630 to UICC 215. GBA authentication request 630 may request UICC 215 to authenticate UE 210 using GBA authentication.

UICC 215 may receive GBA authentication request 630, and may provide security key 450 to BSF 230 in response to GBA authentication request 630. In one example, security key 450 may include a security key for an enterprise that provides the service that UE 210 is attempting to use. Alternatively, security key 450 may not be provided or may include a security key for an enterprise that does not provide the enterprise service. BSF 230 may provide, to NAF 220, a request 640 for a security key based on the service identifier provided in request 620. NAF 220 may retrieve a security key 650 for the requested enterprise based on request 640 (e.g., as identified by the service identifier), and may provide security key 650 to BSF 230. BSF 230 may authenticate UE 210 for use of the enterprise service based on security key 450 and/or based on security key 650. For example, BSF 230 may compare security key 450 with security key 650 to determine whether UE 210 is authenticated for use of the enterprise service. If security key 450 matches security key 650, BSF 230 may authenticate UE 210 for use of the enterprise service. Based on the authentication of UE 210, BSF 230 may generate a response 660 that may indicate a success or failure of the authentication and/or may include additional information related to the authentication.

BSF 230 may provide response 660 to enterprise server 240, and enterprise server 240 may determine whether UE 210 is authenticated for the enterprise service based on response 660. For example, if response 660 indicates that UE 210 is authenticated for the enterprise service, enterprise server 240 may permit the user, via UE 210, to use the enterprise service, as indicated by reference number 670. If response 660 indicates that UE 210 is not authenticated for the enterprise service, enterprise server 240 may not permit the user to use the enterprise service, as further indicated by reference number 670.

Although FIG. 6 shows example components of environment portion 600, in other implementations, environment portion 600 may include fewer components, different components, differently arranged components, or additional components than depicted in FIG. 6. Alternatively, or additionally, one or more components of environment portion 600 may perform one or more other tasks described as being performed by one or more other components of environment portion 600.

FIGS. 7-9 are flow charts of an example process 700 for providing secure enterprise service delivery according to an implementation described herein. In one implementation, process 700 may be performed by BSF 230. Alternatively, or additionally, some or all of process 700 may be performed by another device or group of devices, including or excluding BSF 230.

As shown in FIG. 7, process 700 may include receiving information associated with enterprises supported by a network (block 710), and determining enterprise identifiers for enterprises identified in the enterprises information (block 720). For example, in an implementation described above in connection with FIG. 4, enterprise servers 240 may provide enterprises information 440 to BSF 230, and BSF 230 may receive enterprises information 440. Enterprises information 440 may include names of enterprises, and information associated with applications, services, and/or network resources provided by enterprises. BSF 230 may group one or more applications, services, and/or network resources, associated with a particular enterprise identified in enterprises information 440, into an enterprise package. BSF 230 may associate an identifier (e.g., referred to herein as an enterprise ID) with each enterprise package created by BSF 230 for one or more enterprises.

As further shown in FIG. 7, process 700 may include receiving information associated with devices and/or subscribers in the network (block 720), and determining other security parameters based on the devices/subscribers information (block 730). For example, in an implementation described above in connection with FIG. 4, subscriber information 410 may include information associated with a user (e.g., of UE 210), such as a subscriber identification, a subscriber name, a subscriber address, subscriber account information, etc. UE information 420 may include an identifier of UE 210; attachment point information; information that identifies a geographical location of UE 210; a zip code associated with UE 210; information that identifies a type of UE 210; information that identifies UE 210 capabilities; etc. Other subscribers/UEs information 430 may include information about other UEs 210, users of other UEs 210, connection points of other UEs 210 (e.g., to network 260), etc. BSF 230 may receive information 410-430. BSF 230 may determine other security key parameters for the KDF based on subscriber information 410, UE information 420, and/or other subscribers/UEs information 430.

Returning to FIG. 7, process 700 may include generating a security key for each enterprise identifier based on the other security key parameters (block 750). For example, in an implementation described above in connection with FIG. 4, BSF 230 may generate a security key (e.g., a GBA key) for each enterprise ID based on the determined other security key parameters. In one example, BSF 230 may generate a security key for an enterprise associated with UICC 215 of UE 210, and may provide the security key to UICC 215, as indicated by reference number 450. Alternatively, or additionally, BSF 230 may generate security keys for the enterprises defined by BSF 230, and may provide the security keys for the enterprises to NAF 220, as indicated by reference number 470.

As further shown in FIG. 7, process 700 may include storing the security keys in a storage device (block 760), and providing particular security keys to particular user equipment of the network (block 770). For example, in an implementation described above in connection with FIG. 4, BSF 230 may provide security keys 460 for the service packages, security keys 470 for the enterprises, and security keys 480 for the enterprise sub-groups to NAF 220, and NAF 220 may store security keys 460-480 in a storage device (e.g., storage device 350) referred to as a NAF Key Center. Alternatively, or additionally, BSF 230 may store security keys 460-480 in a storage device (e.g., storage device 350) associated with BSF 230. BSF 230 and/or NAF 220 may provide one or more of security keys 460-480 to one or more UICCs 215 associated with one or more UEs 210.

Process block 730 may include the process blocks depicted in FIG. 8. As shown in FIG. 8, process block 730 may include receiving information associated with user equipment of the network (block 800), receiving information associated with subscribers of the network (block 810), receiving information associated with locations of user equipment (block 820), and/or receiving other information associated with the network (block 830). For example, in an implementation described above in connection with FIGS. 4 and 5, subscriber information 410 may include information associated with a user (e.g., of UE 210), such as a subscriber identification, a subscriber name, a subscriber address, subscriber account information, etc. UE information 420 may include an identifier of UE 210; attachment point information; information that identifies a geographical location of UE 210; a zip code associated with UE 210; information that identifies a type of UE 210; information that identifies UE 210 capabilities; etc. Other subscribers/UEs information 430 may include information about other UEs 210, users of other UEs 210, connection points of other UEs 210 (e.g., to network 260), etc. Location information 560 may include information associated with physical locations (e.g., GPS locations) of one or more UEs 210. Other information 570 may include information obtained from accounting systems, billing systems, marketing systems, etc. associated with environment 200. BSF 230 may receive subscriber information 410, UE information 420, other subscribers/UEs information 430, location information 560, and/or other information 570.

Process block 750 may include the process blocks depicted in FIG. 9. As shown in FIG. 9, process block 750 may include generating a single security key for a particular enterprise based on the other security key parameters (block 900), and generating security keys for sub-groups of enterprises based on the other security key parameters (block 910). For example, in an implementation described above in connection with FIG. 4, BSF 230 may generate security keys for each of the enterprises defined by BSF 230, and may provide the security keys for the enterprises to NAF 220, as indicated by reference number 470. Alternatively, or additionally, BSF 230 may generate security keys for the enterprise sub-groups defined by BSF 230, and may provide the security keys for the enterprise sub-groups to NAF 220, as indicated by reference number 480.

Systems and/or methods described herein may utilize an enterprise's name as a unique identifier and for input into a Key Derivation Function (KDF) for generating a security key (e.g., a GBA key) unique to the enterprise. The security key may be used to control, protect, and route service requests and service delivery to subscribers of the enterprise.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code--it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, enterprise information associated with an enterprise supported by a network;
   determining, by the device, a first enterprise identifier and a second enterprise identifier for the enterprise associated with the enterprise information;
   receiving, by the device, information associated with user devices associated with the enterprise, the information associated with the user devices including one or more of:
      information associated with subscribers of services provided by the enterprise via the network,
      information associated with user equipment that access the services provided by the enterprise via the network, or
      information associated with locations of the user devices;
   grouping, by the device and based on the information associated with the user devices, the user devices into a first group of user devices and a second group of user devices;
      a first portion of the information associated with the user devices being associated with the first group of user devices, and
      a second portion of the information associated with the user devices being associated with the second group of user devices;
   determining, by the device, a group of first security parameters for the first group of user devices based on the first enterprise identifier and the first portion of the information;
   determining, by the device, a group of second security parameters for the second group of user devices based on the second enterprise identifier and the second portion of the information;
   generating, by the device and based on the group of first security parameters, one or more first security keys for authenticating the first group of user devices; and
   generating, by the device and based on the group of second security parameters, one or more second security keys for authenticating the second group of user devices,
      the one or more first security keys and the one or more second security keys including generic bootstrapping architecture keys,
         each of the generic bootstrapping architecture keys being used as a single security key for authenticating user devices accessing one or more applications grouped in a service package associated with the user devices.

2. The method of claim 1, where determining the first enterprise identifier and the second enterprise identifier includes:
   grouping services, provided by the enterprise, into a first enterprise package and a second enterprise package; and
   determining the first enterprise identifier and the second enterprise identifier based on grouping the services into the first enterprise package and the second enterprise package.

3. The method of claim 1, further comprising one of:
   storing the one or more first security keys and the one or more second security keys in a storage device associated with the device; or
   providing the one or more first security keys and the one or more second security keys to a network application function (NAF) device for storage.

4. The method of claim 1, where generating the one or more first security keys includes:
   generating the one or more generic bootstrapping architecture keys based on at least one of:
      an integrated circuit card identification,
      a bootstrapping transaction identifier,
      a random challenge generated by a home location register,
      a mobile equipment identifier, or
      an international mobile equipment identifier.

5. The method of claim 1, where the information associated with the user devices includes:
the information associated with the locations of the user devices, and
where the information associated with the locations of the user devices includes:
information that identifies attachment point information associated with one or more of the user devices.

6. The method of claim 1, where generating the one or more first security keys includes:
generating, based on the group of first security parameters, a single security key.

7. The method of claim 1, where determining the first enterprise identifier and the second enterprise identifier includes:
defining enterprise sub-groups for the enterprise; and
associating an enterprise sub-group identifier with each of the enterprise sub-groups.

8. A device, comprising:
a processor, implemented at least partially in hardware, to:
receive enterprise information associated with enterprises supported by a network,
create a first enterprise identifier and a second enterprise identifier for an enterprise of the enterprises associated with the enterprise information,
receive information associated with user devices associated with the enterprise,
the information associated with the user devices including one or more of:
information associated with subscribers of services provided by the enterprise via the network,
information associated with user equipment that access the services provided by the enterprise via the network, or
information associated with locations of the user devices,
group, based on the information associated with the user devices, the user devices into a first group of user devices and a second group of user devices,
the first group of user devices being associated with a first portion of the information associated with the user devices, and
the second group of user devices being associated with a second portion of the information associated with the user devices,
create a first set of security parameters for the first group of user devices based on the first enterprise identifier and the first portion of the information,
create a second set of security parameters for the second group of user devices based on the second enterprise identifier and the second portion of the information,
generate, based on the first set of security parameters, a first security key for authenticating the first group of user devices, and
generate, based on the second set of security parameters, a second security key for authenticating the second group of user devices,
the first security key and the second security key including generic bootstrapping architecture keys,
each of the generic bootstrapping architecture keys being used as a single security key for authenticating user devices accessing one or more applications grouped in a service package associated with the user devices.

9. The device of claim 8, where, when creating the first enterprise identifier and the second enterprise identifier, the processor is to:
group services, provided by the enterprise, into a first enterprise package and a second enterprise package, and
create the first enterprise identifier based on the first enterprise package and the second enterprise identifier based on the second enterprise package.

10. The device of claim 8, where the processor is further to one of:
store the first security key and the second security key in a memory of the device, or
provide the first security key and the second security key to a network application function (NAF) device for storage.

11. The device of claim 8, where, when generating the first security key, the processor is to:
generate the first security key based on inputting a name of the enterprise into a key derivative function.

12. The device of claim 8, where the information associated with the enterprises includes at least one of:
information associated with services provided by the enterprise via the network,
information associated with applications provided by the enterprise via the network, or
information associated with network resources associated with the enterprise.

13. The device of claim 8, where, when generating the first security key, the processor is to:
associate the first enterprise identifier with the enterprise, and
generate, based on the first set of security parameters, a plurality of security keys associated with the first enterprise identifier.

14. The device of claim 8, where, when creating the first enterprise identifier and the second enterprise identifier, the processor is to:
define, based the information associated with the user devices, a first enterprise sub-group and a second enterprise sub-group for the enterprise sub-group, and
associate a first enterprise sub-group identifier with the first enterprise and a second enterprise sub-group identifier with the second enterprise sub-group.

15. The device of claim 8, where the device comprises one of a bootstrapping server function (BSF) device or a network application function (NAF) device.

16. A non-transitory computer-readable medium storing instructions, the instructions comprising:
one or more instructions that, when executed by a processor of a device, cause the processor to:
receive enterprise information associated with one or more enterprises supported by a network,
group one or more services, provided by the one or more enterprises, into a first enterprise package and a second enterprise package,
assign a first enterprise identifier to the first enterprise package and a second enterprise identifier to the second enterprise package,
receive information associated with user devices associated with the one or more enterprises,
the information associated with the user devices including one or more of:
information associated with subscribers of services provided by the enterprise via the network,
information associated with user equipment that access the services provided by the enterprise via the network, or
information associated with locations of the user devices, group, based on the information associated with the user devices, the user devices into a first group of user devices and a second group of user devices,
the first group of user devices being associated with a first portion of the information associated with the user devices, and
the second group of user devices being associated with a second portion of the information associated with the user devices,
determine a first security parameter for the first group of user devices based on the first portion of the information and the first enterprise identifier,
determine a second security parameter for the second group of user devices based on the second portion of the information and the second enterprise identifier,
generate, based on the first security parameter, a first generic bootstrapping architecture key associated with the first group of users,
the first generic bootstrapping architecture key being used as a single security key for authenticating the first group of users accessing one or more applications group in a first service package associated with the first group of users, and
generate, based on the second security parameter, a second generic bootstrapping architecture key associated with the second group of users,
the second generic bootstrapping architecture key being used as a single security key for authenticating the second group of users accessing one or more applications group in a second service package associated with the second group of users.

17. The non-transitory computer-readable medium of claim 16, where the instructions further comprise:
one or more instructions that, when executed by the processor, cause the processor to one of:
store the first generic bootstrapping architecture key and the second generic bootstrapping architecture key in a storage device associated with the device, or
provide the first generic bootstrapping architecture key and the second generic bootstrapping architecture key to a network application function (NAF) device for storage.

18. The non-transitory computer-readable medium of claim 16, where the one or more instructions to generate the first by Examiner Amendment generic bootstrapping architecture key include:
one or more instructions that, when executed by the processor, cause the processor to:
generate the first generic bootstrapping architecture (GBA) key based on at least one of:
an integrated circuit card identification,
a bootstrapping transaction identifier,
a random challenge generated by a home location register,
a mobile equipment identifier, or
an international mobile equipment identifier.

19. The non-transitory computer-readable medium of claim 16, where the information associated with the user devices includes the information associated with the locations of the user device, and
where the information associated with the locations of the user devices includes:
information that identifies a zip code associated with one or more of the user devices.

20. The non-transitory computer-readable medium of claim 16, where the first security parameter includes a name of the one or more enterprises, and
where the one or more instructions to generate the first generic bootstrapping architecture key include:
one or more instructions that, when executed by the processor, cause the processor to:
generate, based on the name of the one or more enterprises, the first generic bootstrapping architecture key.

21. The non-transitory computer-readable medium of claim 16, where the one or more instructions to assign the first enterprise identifier and the second enterprise identifier include:
one or more instructions that, when executed by the processor, cause the processor to:
define enterprise sub-groups for the one or more enterprises,
associate an enterprise sub-group identifier with each of the enterprise sub-groups, and
associate the first enterprise identifier with the first enterprise package and the second enterprise identifier with the second enterprise package based on associating the enterprise sub-group identifier with each of the enterprise sub-groups.

* * * * *